United States Patent
Skidmore et al.

(10) Patent No.: US 7,632,022 B2
(45) Date of Patent: Dec. 15, 2009

(54) COMPONENT ASSEMBLY AND FABRICATION METHOD

(75) Inventors: Jay Skidmore, San Jose, CA (US); Richard Duesterberg, Mountain View, CA (US)

(73) Assignee: JDS Uniphase Corporation, Milpitas, CA (US)

(*) Notice: Subject to any disclaimer, the term of this patent is extended or adjusted under 35 U.S.C. 154(b) by 14 days.

(21) Appl. No.: 11/960,255

(22) Filed: Dec. 19, 2007

(65) Prior Publication Data

US 2009/0052857 A1    Feb. 26, 2009

Related U.S. Application Data

(60) Provisional application No. 60/882,012, filed on Dec. 27, 2006.

(51) Int. Cl.
*G02B 6/36* (2006.01)

(52) U.S. Cl. .................................................. 385/88

(58) Field of Classification Search ............... 385/88
See application file for complete search history.

(56) References Cited

U.S. PATENT DOCUMENTS

| | | | |
|---|---|---|---|
| 4,523,802 A | 6/1985 | Sakaguchi et al. | 385/91 |
| 4,844,581 A | 7/1989 | Turner | 385/91 |
| 5,745,624 A | 4/1998 | Chan et al. | 385/91 |
| 6,292,499 B1 | 9/2001 | Pearson et al. | 372/36 |
| 6,679,636 B1 | 1/2004 | Gilman et al. | 385/90 |
| 6,720,582 B2 | 4/2004 | Miyokawa et al. | 257/98 |
| 6,758,610 B2 | 7/2004 | Ziari et al. | 385/92 |
| 6,883,978 B2 | 4/2005 | Powers | 385/92 |
| 6,961,357 B2 | 11/2005 | Moriya et al. | 372/34 |
| 7,284,913 B2 | 10/2007 | Powers | 385/92 |

*Primary Examiner*—Jerry T Rahll
(74) *Attorney, Agent, or Firm*—Matthew A. Pequignot; Pequignot + Myers LLC

(57) ABSTRACT

The present invention relates to a component assembly and to a method of fabricating such a component assembly. The component assembly includes a substrate, a mount attached to the substrate, and a component attached to the mount with solder by melting the solder with light from a light source. The mount is composed of a ceramic material having properties advantageous for soldering using a light source. As a first property, the ceramic material is optically absorptive to enable the mount to be heated by the light from the light source. As a second property, the ceramic material has a first thermal conductivity at an operating temperature of the component and a second thermal conductivity at a melting point of the solder, the second thermal conductivity being at least 25% lower than the first thermal conductivity.

25 Claims, 4 Drawing Sheets

COMPONENT ASSEMBLY AND FABRICATION METHOD

CROSS-REFERENCE TO RELATED APPLICATIONS

The present invention claims priority from U. S. Provisional Patent Application No. 60/882,012 filed Dec. 27, 2006, which is incorporated herein by reference.

TECHNICAL FIELD

The present invention relates to the attachment of components to a substrate and, in particular, to the attachment of components to a substrate through a mount composed of a ceramic material.

BACKGROUND OF THE INVENTION

For efficient signal transmission in an optical system, components, such as optical fibers, lasers, mirrors, lenses, microelectromechanical (MEMS) devices, isolators, modulators, and detectors, must be positioned accurately and reliably. For example, in a fiber-coupled laser module, a laser and an optical fiber must be positioned in mutual alignment to obtain a high coupling efficiency. However, accurate positioning of such components is difficult to achieve and maintain.

To facilitate their positioning, such components are often attached to a substrate through a mount. The mount is attached to the substrate, and the component is attached to the mount, forming a component assembly. In the fabrication of a such a component assembly, the component is, typically, soldered to the mount by using a heating means to melt a solder.

The mount may be fabricated from a variety of materials, but ceramic materials are particularly suitable, owing to their advantageous thermal and mechanical characteristics. For example, a mount composed of silica ($SiO_2$), as disclosed in U.S. Pat. No. 4,523,802 to Sakaguchi, et al., alumina ($Al_2O_3$), as disclosed in U.S. Pat. No. 6,679,636 to Gilman, et al., or silicon carbide (SiC), as disclosed in U.S. Pat. Nos. 6,883,978 and 7,284,913 to Powers, may be used to attach an optical fiber to a substrate by soldering. In addition, the use of a mount composed of silica, zirconia ($ZrO_2$), macor, or M120 to attach an optical fiber to a substrate by soldering is disclosed in U.S. Pat. No. 6,758,610 to Ziari et al., which is owned by the assignee of the present invention and is incorporated herein by reference.

For another example, a mount composed of beryllia (BeO), boron nitride (BN), aluminum nitride (AlN), or silicon carbide may be used to attach a laser to a substrate, as disclosed in U.S. Pat. No. 6,758,610 to Ziari et al. The use of a mount composed of aluminum nitride to attach a laser to a substrate by soldering is also disclosed in U.S. Pat. No. 6,720,582 to Miyokawa, et al. and U.S. Pat. No. 6,961,357 to Moriya, et al.

Furthermore, a surface of the mount may be metallized for various functions. For example, to promote adhesion of the solder to the mount, the mount may be coated with a layer or a pattern of a metal wettable by the solder, such as gold, as disclosed in U.S. Pat. No. 6,292,499 to Pearson, et al., U.S. Pat. No. 6,720,582 to Miyokawa, et al., and U.S. Pat. No. 6,758,610 to Ziari et al. To provide a barrier to the solder, the mount may be further coated with a layer of a metal non-wettable by the solder, such as titanium, as disclosed in U.S. Pat. No. 6,758,610 to Ziari et al. When a light source, such as a laser, is used as the heating means to melt the solder, a mount composed of an optically non-absorptive ceramic material may be coated with layer of an optically absorptive metal, such as titanium, to enable the mount to be heated by light from the light source, as disclosed in U.S. Pat. No. 6,758,610 to Ziari et al. Disadvantageously, such layers of an optically absorptive metal are easily burned when heated by light from a laser, which limits their applicability to mounts composed of materials having very low thermal conductivities.

An object of the present invention is to overcome the shortcomings of the prior art by providing a component assembly including a mount optimized for soldering using a light source, as well as a method for fabricating such a component assembly. Most importantly, the mount is composed of a ceramic material having properties advantageous for soldering using a light source. The ceramic material is optically absorptive to enable the mount to be heated by light from the light source during soldering, aiding to melt the solder used to attach the component to the mount. Optical absorption by the ceramic material also prevents burning by the light source, allowing ceramic materials having a wide range of thermal conductivities to be used for the mount. Furthermore, the thermal conductivity of the ceramic material is significantly lower at the melting point of the solder than at the operating temperature of the component. Accordingly, the mount retains heat during soldering, facilitating melting of the solder to create the attachment, but dissipates heat during operation, hindering undesired softening of the solder and, thus, improving the reliability of the attachment.

SUMMARY OF THE INVENTION

Accordingly, the present invention relates to a component assembly comprising: a substrate; a mount attached to the substrate; and a component attached to the mount with solder, wherein the mount is composed of a ceramic material, wherein the ceramic material is optically absorptive to enable the mount to be heated by light from a light source, and wherein the ceramic material has a first thermal conductivity at an operating temperature of the component and a second thermal conductivity at a melting point of the solder, wherein the second thermal conductivity is at least 25% lower than the first thermal conductivity.

Another aspect of the present invention relates to a method of fabricating a component assembly, comprising the steps of: a) providing a component; b) providing a substrate; c) providing a mount composed of a ceramic material, wherein the ceramic material is optically absorptive to enable the mount to be heated by light from a light source, and wherein the ceramic material has a first thermal conductivity at an operating temperature of the component and a second thermal conductivity at a melting point of a solder, wherein the second thermal conductivity is at least 25% lower than the first thermal conductivity; d) attaching the mount to the substrate; and e) attaching the component to the mount with the solder by melting the solder with the light from the light source.

BRIEF DESCRIPTION OF THE DRAWINGS

The invention will be described in greater detail with reference to the accompanying drawings which represent preferred, exemplary embodiments thereof, wherein.

DETAILED DESCRIPTION

Figure 1:
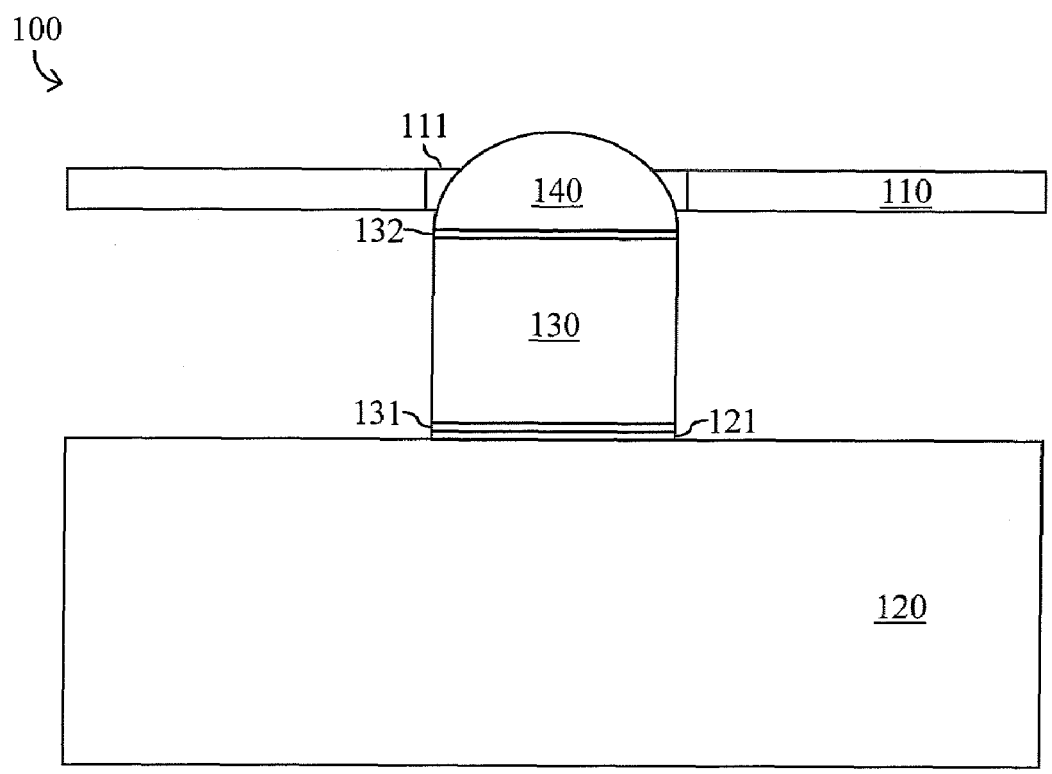
FIG. 1 is a schematic illustration of a side view of a component assembly including an optical fiber as the component.

With reference to FIG. 1, the present invention provides a component assembly 100, as well as a method of fabricating such a component assembly 100. The component assembly 100 includes a component 110, a substrate 120, and a mount 130. A substrate-bonding region 131 on the mount 130 is attached to a bonding region 121 on the substrate 120. A bonding region 111 on the optical fiber 110 is attached to a component-bonding region 132 on the mount 130 with solder 140.

The present invention will be described in the context of a component assembly 100 including an optical fiber 110 as the component. Such a component assembly 100 could be included as part of a fiber-coupled laser module, for example. Alternatively, the component 110 may be a laser, a mirror, a lens, an MEMS device, an isolator, a modulator, or a detector, for example. Preferably, the component 110 is an optical component; however, those skilled in the art will appreciate that the present invention is not limited to optical components.

An important feature of the present invention is that the mount 130 is composed of a ceramic material having properties advantageous for soldering using a light source. As a first property, the ceramic material is optically absorptive; i.e., the ceramic material absorbs visible or near-visible light having a wavelength between 200 nm and 1400 nm. This property enables the mount 130 to be heated by light from a light source. In turn, the mount 130 heats the solder 140, aiding to melt the solder 140. Thus, the use of a mount 130 composed of an optically absorptive ceramic material greatly increases the efficiency of soldering using a light source.

Although virtually any light source may be used as a heating means to melt the solder 140, the preferred light source is a laser. More specifically, the light source is, preferably, a semiconductor diode laser, which, preferably, emits light having a wavelength between 700 nm and 1100 nm at an output power between 1 W and 10 W. An example of a suitable light source is an indium gallium arsenide ($In_xGa_{1-x}As$) diode laser, which emits light having a wavelength between 900 nm and 985 nm.

Preferably, the mount 130 has an optical absorptance of at least 30% at a wavelength of the light from the light source; i.e., of the light from the light source that is incident on the mount 130, the mount 130 absorbs at least 30% at a particular wavelength. More preferably, the mount 130 has an optical absorptance of at least 50% or, even more preferably, of at least 75% at a wavelength of the light from the light source. Most preferably, the mount 130 has an optical absorptance of at least 90% at a wavelength of the light from the light source. In contrast, a conventional mount composed of an optically non-absorptive ceramic material, such as zirconia, and coated with a layer of an optically absorptive metal, such as titanium, typically, has an optical absorptance of less than 30% at a wavelength between 900 nm and 985 nm, when an indium gallium arsenide laser diode is used as a light source.

As a second property, the ceramic material of the mount 130 has a first thermal conductivity at an operating temperature of the optical fiber 110 and a second thermal conductivity at a melting point of the solder 140, the second thermal conductivity being significantly lower than the first. This property ensures that the mount 130 tends to retain heat during soldering, but to dissipate heat during operation. Accordingly, less energy, in the form of light from the light source, must be supplied to melt the solder 140, facilitating the attachment of the optical fiber 110. Furthermore, during operation of the optical fiber 110, for example, as part of a fiber-coupled laser module, the mount 130 minimizes heating of the solder 140, for example, by weakly guided or cladding-mode light, improving the reliability of the attachment.

The second thermal conductivity of the ceramic material at the melting point of the solder 140, which is, typically, between 200° C. and 500° C., is at least 25% lower than the first thermal conductivity at the operating temperature of the optical fiber 110, which is, typically, between 20° C. and 85° C. Preferably, the second thermal conductivity is at least 50% lower than the first thermal conductivity. In some instances, it may be desirable for the first thermal conductivity to be greater than 50 W $m^{-1}$ $K^{-1}$, or for the second thermal conductivity to be less than 50 W $m^{-1}$ $K^{-1}$.

Many oxides have the second property desired for the ceramic material of the mount 130, in that they have a first thermal conductivity at a typical operating temperature of the optical fiber 110 and a second thermal conductivity at a typical melting point of the solder 140, the second thermal conductivity being significantly lower than the first thermal conductivity. For example, approximate values of the thermal conductivities of beryllia, magnesia, calcia (CaO), titania, alumina, and an 85% alumina/15% silica mixture at temperatures of 25° C., 100° C., 400° C., and 500° C. are provided in Table 1 below. The list of ceramic materials in Table 1 is by no means exhaustive, and the provided values are intended as guides only, as the thermal conductivities of the ceramic materials depend on many factors, including the purity, phase, and microstructure of the ceramic materials, as well as temperature.

TABLE 1

| Ceramic Material | Thermal Conductivity (W $m^{-1}K^{-1}$) | | | |
|---|---|---|---|---|
| | at 25° C. | at 100° C. | at 400° C. | at 500° C. |
| BeO | 300 | 210 | 90 | 70 |
| MgO | 50 | 36 | 18 | 15 |
| CaO | 16 | — | — | 9 |
| $TiO_2$ | 12 | 7 | 4 | — |
| $Al_2O_3$ | 33 | 30 | 13 | 12 |
| 85% $Al_2O_3$/15% $SiO_2$ | 15 | — | — | 7 |

All of the ceramic materials listed in Table 1, both the oxides and the oxide mixture, have a second thermal conductivity at 400° C. or 500° C. that is at least 50% lower than a first thermal conductivity at 25° C. Furthermore, as can be appreciated by a comparison of the values provided for alumina and those provided for the 85% alumina/15% silica mixture, a second oxide may included in the ceramic material, in addition to a first oxide, to modify the first thermal conductivity or the second thermal conductivity of the ceramic material.

Figure 2:
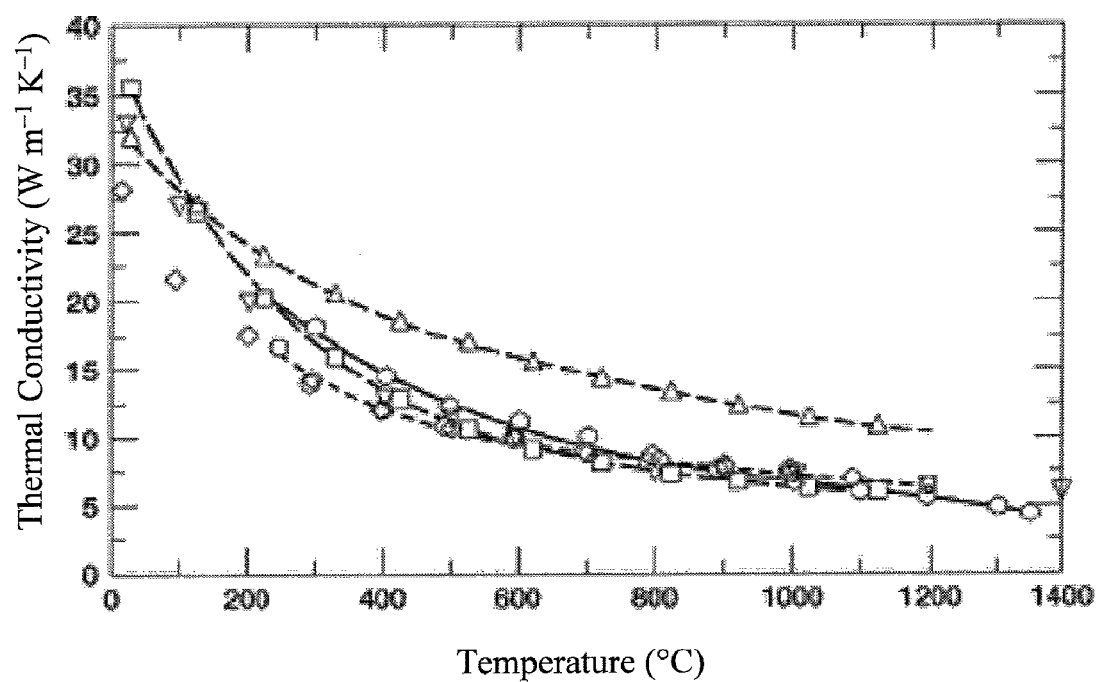
FIG. 2 is an illustration of plots of thermal conductivity versus temperature for alumina, from various studies.

Plots of thermal conductivity versus temperature for alumina, from various studies, are illustrated in FIG. 2. According to the illustrated plots, alumina has a second thermal conductivity of between 12.5 W $m^{-1}$ $K^{-1}$ and 22.5 W $m^{-1}$ $K^{-1}$ at 300° C. and a first thermal conductivity of between 25 W $m^{-1}$ $K^{-1}$ and 37.5 W $m^{-1}$ $K^{-1}$ at 25° C., the second thermal conductivity being between 30% and 50% lower than the first thermal conductivity.

However, in their pure forms, the oxides and the oxide mixture listed in Table 1 do not have the first property desired for the ceramic material of the mount 130, in that they are not optically absorptive. To render the ceramic material optically absorptive, a coloring agent, such as a transition-metal oxide, may be included in the ceramic material, in addition to a first oxide or an oxide mixture. An example of a suitable ceramic material is brown alumina, which typically includes at least 90% alumina and at most 1% ferric oxide ($Fe_2O_3$), as a coloring agent, in addition to other oxides, such as silica and titania.

Figure 3A:
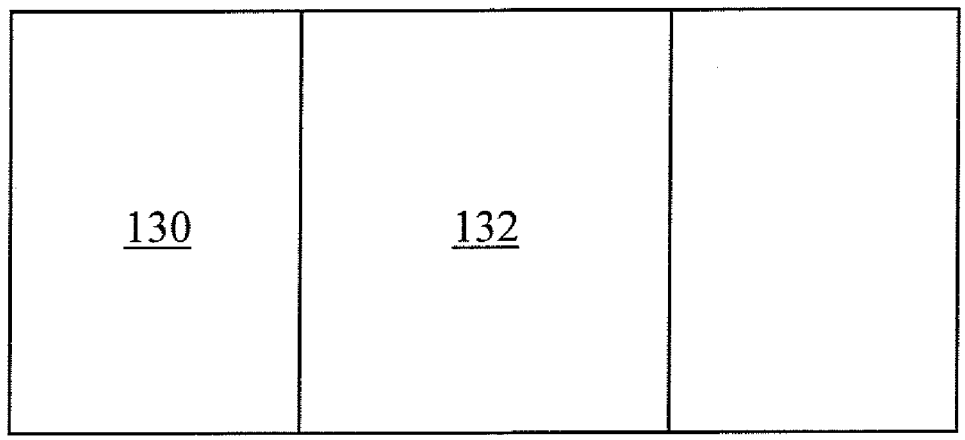
FIG. 3A is a schematic illustration of a top view of a mount.
Figure 3B:
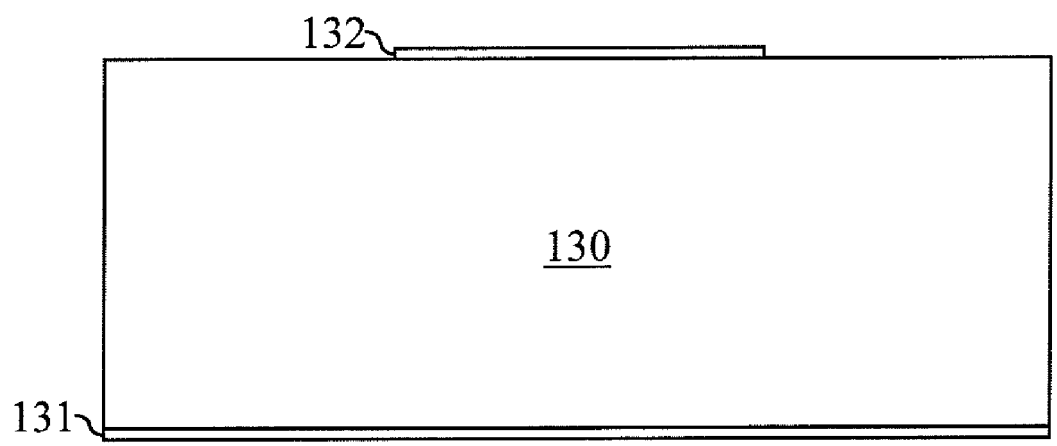
FIG. 3B is a schematic illustration of a side view of a mount.

With reference to FIGS. 3A and 3B, the mount 130 may be fashioned as a monolithic rectangular slab. Alternatively, the mount 130 may be fashioned as a more complex shape. The mount 130 should be large enough to enable efficient melting of the solder 140 and a strong attachment of the optical fiber 110. Exemplary dimensions for the illustrated embodiment are approximately 2 mm×0.9 mm×0.8 mm. In the component assembly 100, the substrate-bonding region 131 on the mount 130 is attached to the substrate 120, and the component-bonding region 132 on the mount 130 is attached to the optical fiber 110 with solder 140. Preferably, the substrate-bonding region 131 and the component-bonding region 132 are located on opposite surfaces of the mount 130, as in the illustrated embodiment.

In some instances, the mount 130 is composed of a ceramic material having a third advantageous property of being non-wettable by the solder 140. This property enables the ceramic material to provide a barrier to the solder 140. In such instances, the substrate-bonding region 131 and the component-bonding region 132 on the mount 130 are each coated with a layer of a metal wettable by the solder 140, such as gold. Accordingly, the ceramic material acts as a solder dam that restricts the molten solder 140 to the metallized substrate-bonding region 131 and the metallized component-bonding region 132.

Figure 4:
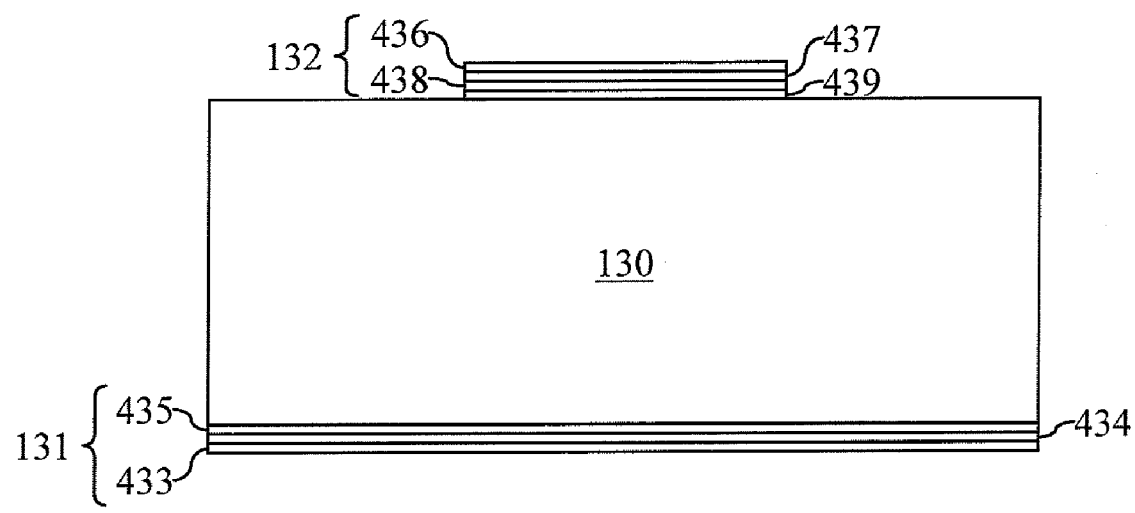
FIG. 4 is a schematic illustration of a side view of a mount coated with a plurality of metallic layers.

Furthermore, the substrate-bonding region 131 and the component-bonding region 132 on the mount 130 may be coated with a plurality of metallic layers for various functions. With reference to FIG. 4, in a preferred embodiment, the substrate-bonding region 131 includes a layer 433 of gold, a layer 434 of platinum, and a layer 435 of titanium. The component-bonding region 132 includes a layer 436 of gold, a layer 437 of platinum, a layer 438 of nickel, and a layer 439 of titanium. The layers 433 and 436 of gold, which is wettable by the solder 140, promote adhesion of the solder 140 to the mount 130. The layers 434 and 437 of platinum prevent diffusion of material from the mount 130 or the substrate 120 into the solder 140, and vice versa. Likewise, the layer 438 of nickel also provides a diffusion barrier. The layers 435 and 439 of titanium, which is optically absorptive and non-wettable by the solder 140, absorb light from the light source, and provide a barrier to the solder 140. The metallic layers 433 to 439 may be deposited to a thickness of between 0.1 µm and 1 µm by physical vapor deposition (PVD), plating, or any other suitable method.

With reference again to FIG. 1, the substrate-bonding region 131 on the mount 130 is, preferably, attached to the bonding region 121 on the substrate 120 with solder (not shown). Preferably, the solder used to attach the mount 130 to the substrate 120 and the solder 140 used to attach the optical fiber 110 to the mount 130 are of the same type. The substrate 120 may be a platform or a housing, for example. Preferably, the substrate 120 is composed of a ceramic material, such as alumina, and the bonding region 121 is coated with a layer of a metal wettable by the solder, such as gold. In some instances, the bonding region 121 on the substrate 120 may be coated with a plurality of metallic layers for various functions, as described heretofore.

In a preferred embodiment, the bonding region 111 on the optical fiber 110 is, similarly, metallized to promote adhesion of the solder 140. Preferably, the bonding region 111 is coated with a layer of a material wettable by the solder 140, such as a nickel/gold alloy. Alternatively, the bonding region 111 may be uncoated, and the solder 140 may be flowed completely around the bonding region 111 to attach the optical fiber 110 to the component-bonding region 132 on the mount 130.

The solder 140, preferably, has a relatively high melting point between 200° C. and 500° C., as mentioned heretofore. In some instances, an alloy is preferred as the solder 140. In such instances, the solder 140 is, preferably, a hard solder, such as a gold/tin alloy or a gold/germanium alloy. More preferably, the solder 140 is a eutectic alloy, such as an 80% gold/20% tin alloy, which has a melting point of about 280° C.

In other instances, a glass solder may be preferred as the solder 140. In such instances, the solder 140 is, preferably, a glass solder having a melting point near 350° C. With respect to a glass solder, the term "melting point", as used herein, refers to a glass-transition temperature. Advantageously, when a glass solder is used as the solder 140, metallization of the bonding region 111 on the optical fiber 110 and of the component-bonding region 132 on the mount 130 is unnecessary.

The fabrication of such a component assembly 100 includes providing a component, such as the optical fiber 110, a substrate 120, and a mount 130, in accordance with the preceding description. In particular, the provided mount 130 must be compatible with the light source and the solder 140 to be used for soldering. For example, in a preferred embodiment, a mount 130 composed of dark alumina is provided for use with an indium gallium arsenide diode laser, which emits light at a wavelength between 900 nm and 985 nm, as the light source and with an 80% gold/20% tin alloy as the solder 140.

The substrate-bonding region 131 on the provided mount 130 is attached to bonding region 121 on the substrate 120. Preferably, this attachment step includes soldering the mount 130 to the substrate 120. More preferably, this attachment step includes attaching the mount 130 to the substrate 120 with solder by melting the solder with the light from the light source.

The optical fiber 110 is then soldered to the mount 130, using the light source. The bonding region 111 on the optical fiber 110 is positioned over the component-bonding region 132 on the mount 130, with the solder 140 positioned between and/or adjacent to the bonding region 111 and the component-bonding region 132. Light from the light source is directed towards the solder 140 and the mount 130 to melt the solder 140. Once the solder 140 is molten, the light source is turned off or directed away from the solder 140 and the mount 130. The solder 140 then cools and solidifies, fixing the position of the optical fiber 110.

Of course, numerous other embodiments may be envisaged without departing from the spirit and scope of the invention.

We claim:

1. A component assembly comprising:
    a substrate;
    a mount attached to the substrate; and
    a component attached to the mount with solder,
    wherein the mount is composed of a ceramic material,
    wherein the ceramic material is optically absorptive to enable the mount to be heated by light from a light source, and
    wherein the ceramic material has a first thermal conductivity at an operating temperature of the component and a second thermal conductivity at a melting point of the solder,
    wherein the second thermal conductivity is at least 25% lower than the first thermal conductivity.

2. The component assembly of claim 1 wherein the component is an optical fiber.

3. The component assembly of claim 1 wherein the mount has an optical absorptance of at least 30% at a wavelength between 700 nm and 1100 nm.

4. The component assembly of claim 1 wherein the operating temperature of the component is between 20° C. and 85° C.

5. The component assembly of claim 1 wherein the melting point of the solder is between 200° C. and 500° C.

6. The component assembly of claim 1 wherein the second thermal conductivity is at least 50% lower than the first thermal conductivity.

7. The component assembly of claim 1 wherein the ceramic material comprises a first oxide.

8. The component assembly of claim 7 wherein the first oxide is selected from the group consisting of beryllia, magnesia, calcia, titania, and alumina.

9. The component assembly of claim 7 wherein the ceramic material further comprises a second oxide to modify the first thermal conductivity or the second thermal conductivity.

10. The component assembly of claim 7 wherein the ceramic material further comprises a coloring agent to render the ceramic material optically absorptive.

11. The component assembly of claim 10 wherein the coloring agent is a transition-metal oxide.

12. The component assembly of claim 1 wherein the ceramic material is non-wettable by the solder to provide a barrier to the solder.

13. The component assembly of claim 1 wherein the solder is selected from the group consisting of a gold/tin alloy, a gold/germanium alloy, and a glass solder.

14. A method of fabricating a component assembly, comprising the steps of:
   a) providing a component;
   b) providing a substrate;
   c) providing a mount composed of a ceramic material,
      wherein the ceramic material is optically absorptive to enable the mount to be heated by light from a light source, and
      wherein the ceramic material has a first thermal conductivity at an operating temperature of the component and a second thermal conductivity at a melting point of a solder,
      wherein the second thermal conductivity is at least 25% lower than the first thermal conductivity;
   d) attaching the mount to the substrate; and
   e) attaching the component to the mount with the solder by melting the solder with the light from the light source,
      wherein step e) includes heating the mount with the light from the light source.

15. The method of claim 14 wherein the component is an optical fiber.

16. The method of claim 14 wherein the light source is a semiconductor diode laser.

17. The method of claim 14 wherein the light from the light source has a wavelength between 700 nm and 1100 nm.

18. The method of claim 14 wherein the mount has an optical absorptance of at least 30% at a wavelength of the light from the light source.

19. The method of claim 14 wherein the operating temperature of the component is between 20° C. and 85° C.

20. The method of claim 14 wherein the melting point of the solder is between 200° C. and 500° C.

21. The method of claim 14 wherein the second thermal conductivity is at least 50% lower than the first thermal conductivity.

22. The method of claim 14 wherein the ceramic material comprises a first oxide.

23. The method of claim 22 wherein the ceramic material further comprises a coloring agent to render the ceramic material optically absorptive.

24. The method of claim 14 wherein the ceramic material is non-wettable by the solder to provide a barrier to the solder.

25. The method of claim 14 wherein step d) includes soldering the mount to the substrate.

* * * * *